United States Patent
Sill

Patent Number: 5,372,711
Date of Patent: Dec. 13, 1994

[54] TWO STAGE SYSTEM FOR SKIMMING FLOATING PARTICLES

[75] Inventor: Robert T. Sill, Wolfsburg, Germany

[73] Assignee: Daniel L. Bowers Company, Inc., Royal Oak, Mich.

[21] Appl. No.: 58,536

[22] Filed: May 6, 1993

Related U.S. Application Data

[63] Continuation of Ser. No. 773,006, Oct. 15, 1991, abandoned, which is a continuation-in-part of Ser. No. 600,383, Oct. 19, 1990, abandoned.

[51] Int. Cl.$^5$ ............................................. B01D 36/04
[52] U.S. Cl. ................... 210/122; 210/138; 210/167; 210/202; 210/221.2; 210/296; 210/526; 210/540
[58] Field of Search ............... 210/115, 121, 122, 123, 210/126, 128, 129, 138, 167, 202, 221.1, 221.2, 242.1, 296, 538, 540, 706, 744, 800, 526, 523; 55/89, 227, 228, 229; 98/115.2

[56] References Cited

U.S. PATENT DOCUMENTS

| | | | |
|---|---|---|---|
| 464,350 | 12/1891 | Debarle | 405/96 |
| 829,172 | 8/1906 | Pokorny | 405/101 |
| 2,701,235 | 2/1955 | King | 210/121 |
| 4,100,066 | 7/1978 | Bloomer et al. | 210/221.1 |
| 4,432,870 | 2/1984 | Russel | 210/221.1 |
| 4,585,557 | 4/1986 | Turnquist | 210/320 |
| 4,610,785 | 9/1986 | Russell | 210/221.1 |
| 4,722,791 | 2/1988 | Turnquist | 210/320 |
| 4,737,272 | 4/1988 | Szatlowski et al. | 210/221.2 |

FOREIGN PATENT DOCUMENTS

| | | | |
|---|---|---|---|
| 221552 | 3/1910 | Germany . | |
| 1235826 | 3/1967 | Germany . | |
| 3706267 | 9/1988 | Germany | 210/121 |
| 1391032 | 4/1975 | United Kingdom | 210/540 |

*Primary Examiner*—Matthew O. Savage
*Attorney, Agent, or Firm*—Jay C. Taylor

[57] ABSTRACT

A first stage of a two stage apparatus for separating floating paint spray particulates from a collection tank that receives the waterfall backdrop from a commercial paint spray booth has a vertically pivotal weir hinged to a weir box that receives the resulting watery sludge as the floating solids and surface water skim over the weir. A float is connected with the weir by a dog-leg rod to control the flow over the weir at a preselected rate in response to the level of sludge in the weir box, thereby to minimize the proportion of water in the sludge. The sludge is pumped from the weir box into an inlet at the lower end of a consolidator tank. A compressed air diffuser emits streams of minute air bubbles below the inlet gently carries the floating particulates to the water surface where they accumulate and are gradually forced upward as a mass above the surface by underlying particulates continually entering the accumulator. Water from the uppermost particulates drains back into the accumulator. Periodically, the drained uppermost particulates are scraped from the water surface into a final filtering bag. The effectiveness of the scraping is enhanced by maintaining the water level essentially constant in the consolidator.

12 Claims, 6 Drawing Sheets

TWO STAGE SYSTEM FOR SKIMMING FLOATING PARTICLES

The present invention relates to an improved apparatus for concentrating and separating floating solid material from the surface of a liquid, as for example the separation of paint overspray from water resulting from conventional operation of an industrial paint spray booth, and is a continuation of U.S. application Ser. No. 07/773,006, filed Oct. 15, 1991, now abandoned, which was a continuation in part of U.S. application Ser. No. 07/600,383, filed Oct. 19, 1990, also abandoned.

BACKGROUND OF THE INVENTION

The treatment and recycling of waste water has been a significant problem resulting from production line painting processes, such as employed in the automobile and various other industries. Typically, when products are spray painted in an industrial spray booth, the products to be painted are moved along a production line in front of a waterfall that serves as a backdrop for the spray painting. The paint that does not engage and coat the product to be painted strikes the flowing water in the form of overspray and is carried downwardly and eventually to a collection tank.

Various techniques have been employed in attempts to solve the problems involved in separating the paint overspray from the water, disposing of the paint overspray, and returning the water to the spray booth for reuse in the waterfall. Inasmuch as the quantity of paint overspray is a minute proportion of the water flowing into the collection tank, the more efficient separating procedures involved a two stage process wherein a major portion of the water is removed in a first stage. The remaining watery sludge of paint solids is then pumped to a second stage filtration and consolidation apparatus, known as a consolidator, that removes the paint solids and enables recycling of the clear water for reuse in the waterfall. Also various techniques are employed, such as the addition of chemicals, to assure that the paint solids will float in a non-tacky condition on the surface of the water in the collection bank.

SUMMARY OF THE INVENTION

The above-mentioned parent application is directed to an improved first stage of a two-stage process for separating paint solids from the water in the collection tank and is designed to function in conjunction with some of the above-mentioned techniques. In accordance with the improved first stage, the floating solids are removed along with a minor surface portion of the water in the tank by a skimming process that produces a watery sludge of concentrated paint solids. The sludge is then conveyed to the second stage filter or consolidator that may incorporate features described in Turnquist U.S. Pat. Nos. 4,585,557 and 4,722,991.

The present invention in addition is directed to improvements in the second stage consolidator to provide an improved combination first and second stage filtration system. By virtue of the improved first stage, a reduced quantity of water in the sludge that is conveyed to the second stage enables a reduction in size for the second stage equipment, with resulting cost savings and over-all efficiency. The improved second stage also enables improved operating efficiency and a consequent further reduction in size with additional economies.

The skimming process of the improved first stage is enhanced by means of an adjustable weir arranged in the collection tank such that the floating solids and a small proportion of the surface water in the tank float over the upper surface of the weir and into a collector, referred to herein as a box or weir box. The floating solids are thus concentrated within the box as a watery sludge that is then pumped from the box to the second treatment stage.

The adjustable weir comprises a wall portion of the weir box that confronts the surface flow of the water and floating paint solids as these flow from their point of entry into the collection tank and over the weir and into the weir box. Suitable means are provided to adjust the upper surface or edge of the weir to control the rate of flow thereover. Preferably the bottom of the weir is pivotally secured to the box for swinging about a horizontal axis to raise or lower the upper edge of the weir relative to the level of sludge in the tank.

In a preferred structure, a float within the box is connected with the weir to swing the latter about said axis in accordance with the level of the watery sludge on which it floats within the box. If the level of the sludge within the box falls, the float also falls and swings the weir to lower its upper edge and permit an increase in the rate of flow of the surface water and floating paint solids over the weir and into the box. If the watery sludge within the box rises, the float also rises to swing the upper edge of the weir upwardly to decrease the rate of flow over the weir and into the box. In consequence, the watery sludge within the box and the effective height of the weir will attain equilibrium levels whereat the quantity of sludge flowing over the weir and into the box will equal the quantity being pumped from the box to the second separation stage. The equilibrium levels are maintained by means of a pump communicating between the box and the second stage consolidator and adjusted to pump the watery sludge from the box at a preselected rate determined by the desired rate of flow of the floating paint solids and surface water over the weir from the collection tank.

Obviously the float is merely one of numerous known means for sensing the level of sludge within the weir box and for controlling the height of the weir and the quantity of watery sludge flowing over the weir into the box. Also obviously, the quantity of watery sludge flowing over the weir must equal the rate that the sludge is conveyed from the weir box to the second stage. Thus the height of the weir can also be readily controlled by monitoring the rate of sludge removal from the box to the second stage, and by lowering or raising the weir respectively in accordance with increasing or decreasing flow of sludge from the weir box.

Inasmuch as the quantity of sludge will be comparatively small in comparison to the total quantity of water and paint solids received from the paint spray booth, a second pump connected with the collection tank at a level well below the level of the floating paint solids, where the water is essentially free of such solids, returns the excess clear water to the paint spray booth for reuse. For reasons that will be apparent from the following, the latter pump is adjusted such that its pumping rate essentially equals the rate of entry of water into the collection tank, i.e., essentially the rate of flow desired for the waterfall.

It will also be apparent that the apparatus described herein, including the weir box, float controlled swinging weir, and pump connecting the weir box and second stage consolidator, comprises a simple effective apparatus for fine tuning and minimizing the quantity of surface water that is separated from the collection tank along with the floating paint solids. In consequence, the volume of water that must be handled by the consolidator and the size of the latter may be reduced materially with appreciable economies because the cost of the more complicated consolidator is a major cost of the two stage separation process.

From time to time, and in particular for each initial installation of the present invention, it will be necessary to adjust the level of the float with respect to a specific hinged position of the weir. It is accordingly another concept of the invention to provide a dog-leg lever connection between the float and weir. The dog-leg lever comprises two rigid rods having inner ends adjustably secured together at a predetermined angle, whereby the angular position of the weir and the level of the float within the box will also be at preselected positions. The outer ends of the rods are secured nonpivotally to the weir and float respectively. After adjustment of the dog-leg angle between the two rods, the angle is secured and remains fixed unless deliberately unsecured to enable a subsequent adjustment.

By reason of the adjustable dog-leg connection between the weir and float, the level of the latter may be readily preselected for any preselected and desired pivotal angle of the weir. Heretofore, the float position with respect to the weir position has been determined by the cumbersome procedure of partially filling the float with water, as taught by Pokorny U.S. Pat. No. 829,172. Furthermore, by adjusting the dog-leg angle, the leverage of the float to resist opening of the weir, i.e., to resist its swinging in the direction that increases the flow of water over the weir, may be readily preselected. As will be apparent from the detailed description of the invention herein, the dog-leg angle can be adjusted so that a weir and weir box suitable for use with a large capacity consolidator, capable of handling a large flow of water and floating paint solids over the weir, can be readily adapted for use with a comparatively small capacity consolidator and final dewatering bag.

Figure 1:
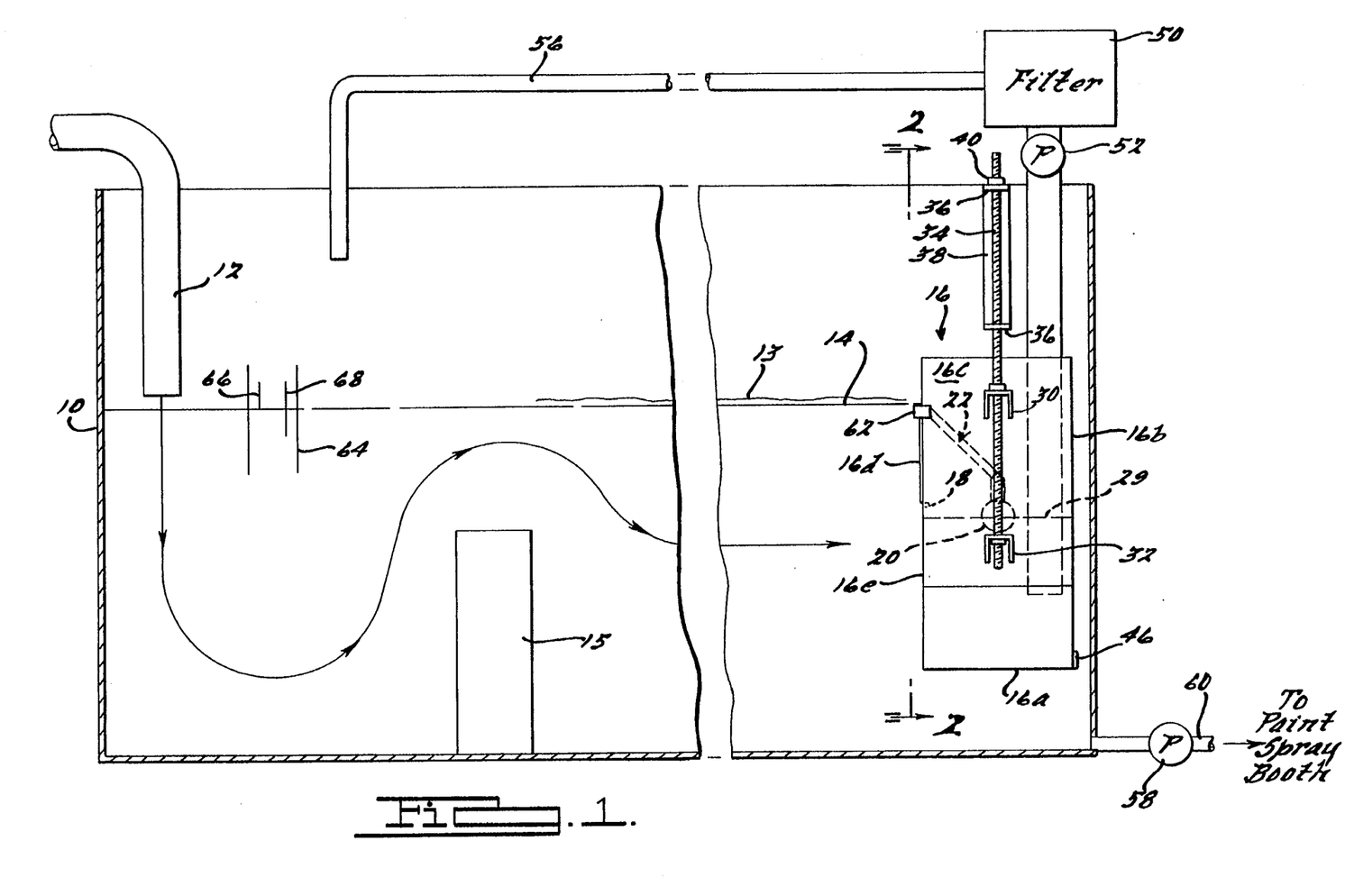
FIG. 1 is a schematic view showing a collection tank in vertical section and a side elevation of a weir box embodying the present invention.

The second stage of the filtration system typically comprises an upright tank or consolidator having an inlet for receiving the watery sludge conveyed or pumped from the weir box, as illustrated in FIG. 1 of said Turnquist patents. Also conventionally, a suitable polymer is added to the sludge before it enters the consolidator to prevent coagulation of the paint solids and to facilitate their flow to the upper fluid level in the consolidator, from which the paint solids are then scraped up a ramp and discharged into a final dewatering bag. The ramp enables water entrained with the paint solids to flow back into the consolidator.

In accordance with the present invention, as the floatable paint solids rise to the upper water surface of the consolidator, they build up a mass of such solids, whereby the upper portions of the paint solids in the mass are supported essentially above the water level by the underlying portions below the water level. As a result, water within the uppermost paint solids within the floating mass drains downwardly into the lower and wetter portions.

An important concept of the improved second stage separation or filtrations system has been to take advantage of the drainage effect and periodically scrape the drained and comparatively dry paint solids from the top of the floating mass, up the aforesaid ramp, and into the final dewatering bag. The drained paint solids that are scraped from the consolidator comprise about 10% to about 15% by weight of the mass that is discharged into the dewatering bag, and are appreciably dryer than the paint solids that are removed by conventional methods.

The time required for an optimum mass of floating paint solids to build up above the water surface in the consolidator between scraping operations is determined by several factors, including the size of the consolidator, the rate of discharge of sludge from the weir box to the consolidator, the type and buoyancy of the paint solids in the floating mass, and the rate of water drainage from the upper portions of that mass. For the typical paint filtration operation, the scraping is performed approximately every 20 minutes, to a half hour, although for some large scale consolidators or where the accumulation of paint solids is relatively slow, the scraping can be hourly.

As the scraper transverses the mass of paint solids and removes a top layer, the resulting reduced weight of the mass enables it to rise into the path of the scraper for one or more additional scrapings of drained paint solids. As the drained paint solids are removed, underlying paint solids rise from the water surface to replace the drained and scraped away paint solids. These underlying solids will initially be too saturated with water to be scraped away without impairing the water separating efficiency of the consolidator. Accordingly after several scrapings, the scraper is deactivated for a predetermined time as noted above until the saturated replacement paint solids have had time to drain. By periodically scraping only the drained paint solids, the efficiency of the consolidator in separating water and paint solids is materially enhanced.

Another important concept of the improved second stage enhances buoyancy of the paint solids as they enter the consolidator. Preferably compressed air is supplied to a defuser hose or pipe located in the consolidator below the level of sludge entry from the weir box. The side walls of the defuser are provided with a multitude of tiny orifices that allow the air to escape in streams of tiny bubbles sized in relation to the average size of the paint particles, as for example 50 to 100 microns in diameter for typical paint spray particles.

It has been a commonplace to inject air bubbles into a consolidator to expedite the upward flow of paint particles, but such bubbles used heretofore have not been controlled in size and have been much too large for effective use. They disturb and churn the overlying mass of paint particles at the water surface and prevent the establishment of a well-defined upper portion of the mass from which water can drain. Also the large bubbles used heretofore entrain water upwardly through the mass of paint particles, tend to saturate the latter with water, and defeat the desired drainage. Accordingly when these paint particles are scraped away from a conventional consolidator, an excessive amount of water is also removed with the paint solids.

The tiny air bubbles used in accordance with the present invention effectively carry the paint solids upwardly to the water level at a reduced rate that does not significantly disturb the overlying mass of paint particles. Also the tiny air bubbles rising through the paint mass do not carry entrained water above the lower level of the particles in the mass, which are water saturated in any event.

THE PRIOR ART

The state of the art known to me is indicated by the following patents:

U.S. Pat. No. 464,350 Debarle
U.S. Pat. No. 829,172 Pokorny
U.S. Pat. NO. 2,701,235 King
U.S. Pat. No. 4,585,557 Turnquist
U.S. Pat. No. 4,722,991 Turnquist
1,391,032 U.K.
221,552 (German)
1,235,826 (German)
DE 3,706,267 (German)
60-163656 (Japan)

Debarle, Pokorny, and the German patents disclose variable height weirs for maintaining a generally constant upstream water level, rather than a control as taught herein for maintaining the upper edge of the weir essentially at the upstream water level regardless of that level, thereby to enable skimming of floating materials with a minimum flow of surface water over the weir. In accordance with the prior art, the upstream water level is controlled by the weir, whereas the weir in the present invention is controlled by the predetermined flow of surface water and paint solids over the weir, i.e. the predetermined rate that the sludge is pumped from the weir box.

Turnquist is concerned with a two stage apparatus for separating floating materials from a water carrier, wherein the floating materials and surface water are skimmed over a weir in a first stage structure that is materially improved by the present invention. In Turnquist, the weir 132 is adjustable in accordance with the initial operating conditions of the first stage collection chamber 138, but after being adjusted, no means are suggested for continually monitoring the height of the weir so that its upper surface will remain at essentially the upstream water level, thereby to skim the floating materials along with a minimum quantity of surface water at all times regardless of minor variations in the upstream water level.

The Japanese patent '656 merely illustrates conventional aeration means without concern for the size of the air bubbles.

King, the U.K. patent, and the German DE'267 patent were cited during prosecution of applicants' parent application. These patents illustrate the state of the art but otherwise are not pertinent to the present invention as claimed.

King is concerned with a swimming pool filtration system and at the outset is non-analogous to a paint-water separation system. In King, the entire volume of the pool water flows over the weir. Also the withdrawal of water and sludge is from the bottom of well 39. No attempt is made to separate sludge from water with a minimum flow over the weir.

The U.K. patent is concerned with the separation of two liquids having different densities and employs a weir to maintain a constant surface level in pond 10. As in King, the box 20 is drained from its bottom.

Other details and advantages of this invention will be apparent from the following description and appended claims, reference being had to the accompanying drawings forming a part of this specification wherein like reference characters designate corresponding parts in the several views.

FIG. 6 is a schematic view similar to FIG. 1, illustrating details associated with the consolidator.

It is to be understood that the invention is not limited in its application to the details of construction and arrangement of parts illustrated in the accompanying drawings, since the invention is capable of other embodiments and of being practiced or carried out in various ways.

DESCRIPTION OF A PREFERRED EMBODIMENT OF THE INVENTION

Referring to the drawings, a collection tank 10 is provided to receive water and paint overspray conducted conventionally from one or more paint spray booths by conduit 12. Preferably, the incoming water and paint overspray are conventionally treated with flocculation chemicals to detackify the paint solids 13 and enhance their floatability on the surface 14 of the water in the tank 10. The latter may vary greatly in size, depending on whether it is a collector from a single, small paint spray booth, or many comparatively large booths. The larger tanks 10 typically may be 20 to 40 feet long, approximately 10 feet wide, 10 to 20 feet deep, and may be dimensioned to hold between 100,000 and 500,000 gallons of fluid which may enter via pipe 12 at a rate in excess of 20,000 gallons per minute. Adjacent one end of the tank 10, where the water and paint solids enter via pipe 12, is a baffle 15 that extends upwardly from the bottom of the tank 10 to entrap nonfloatable solids, such as heavy paint scrapings.

Figure 2:
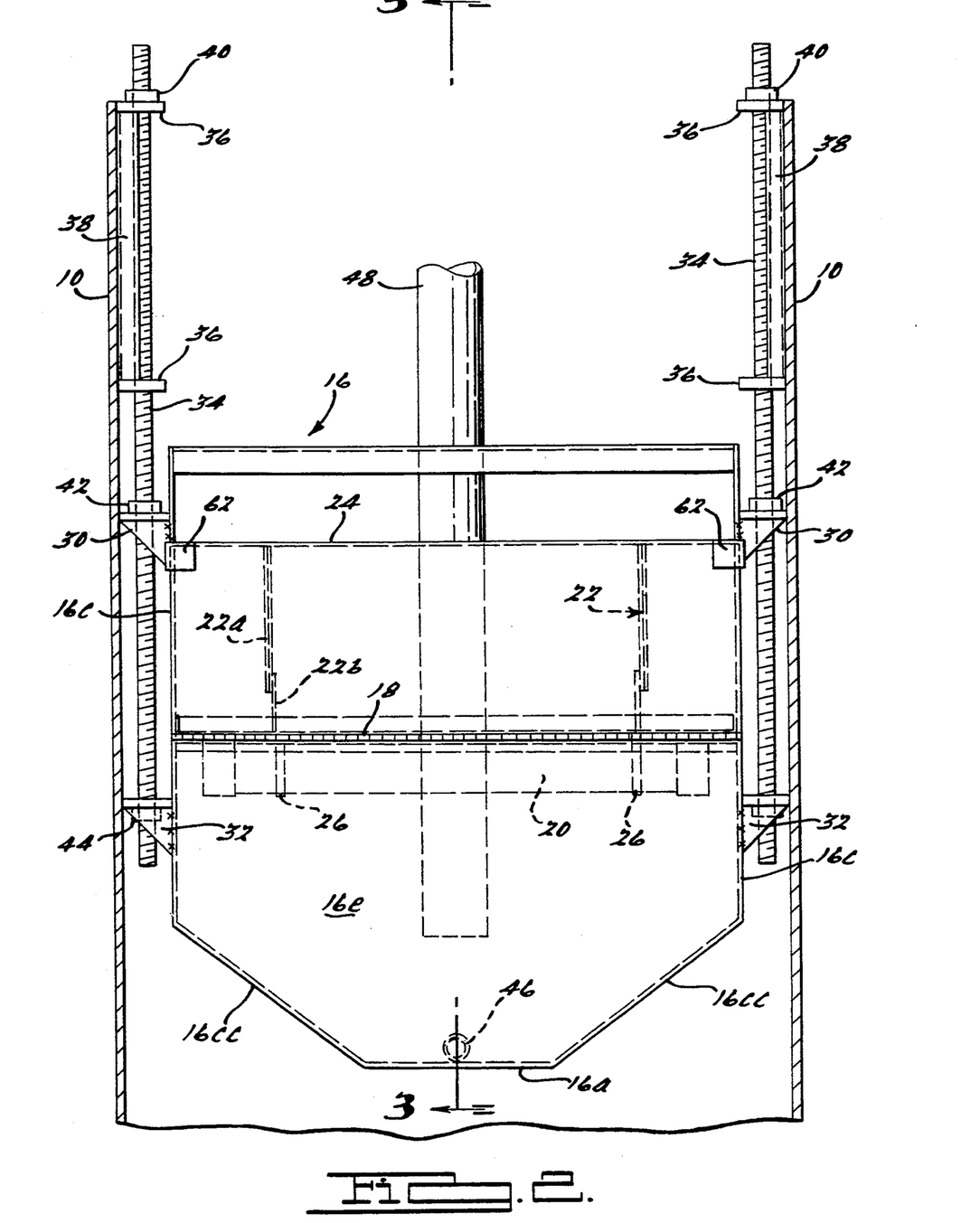
FIG. 2 is a sectional view taken in the direction of the arrows substantially along the line 2—2 of FIG. 1.

The tank 10 extends sufficiently from the entry pipe 12 to enable the floatable paint solids 13 to rise to the water surface 14 as they flow toward a weir box 16 adjacent to the opposite end of the tank 10. The box 16 comprises an open top receptacle for a watery sludge of concentrated paint solids and is defined by a bottom 16a, a backwall 16b adjacent to an endwall of tank 10, parallel lateral side walls 16c confronting opposite sidewalls of the tank 10, FIG. 2, and a two-part front wall 16d and 16e.

Figure 3:
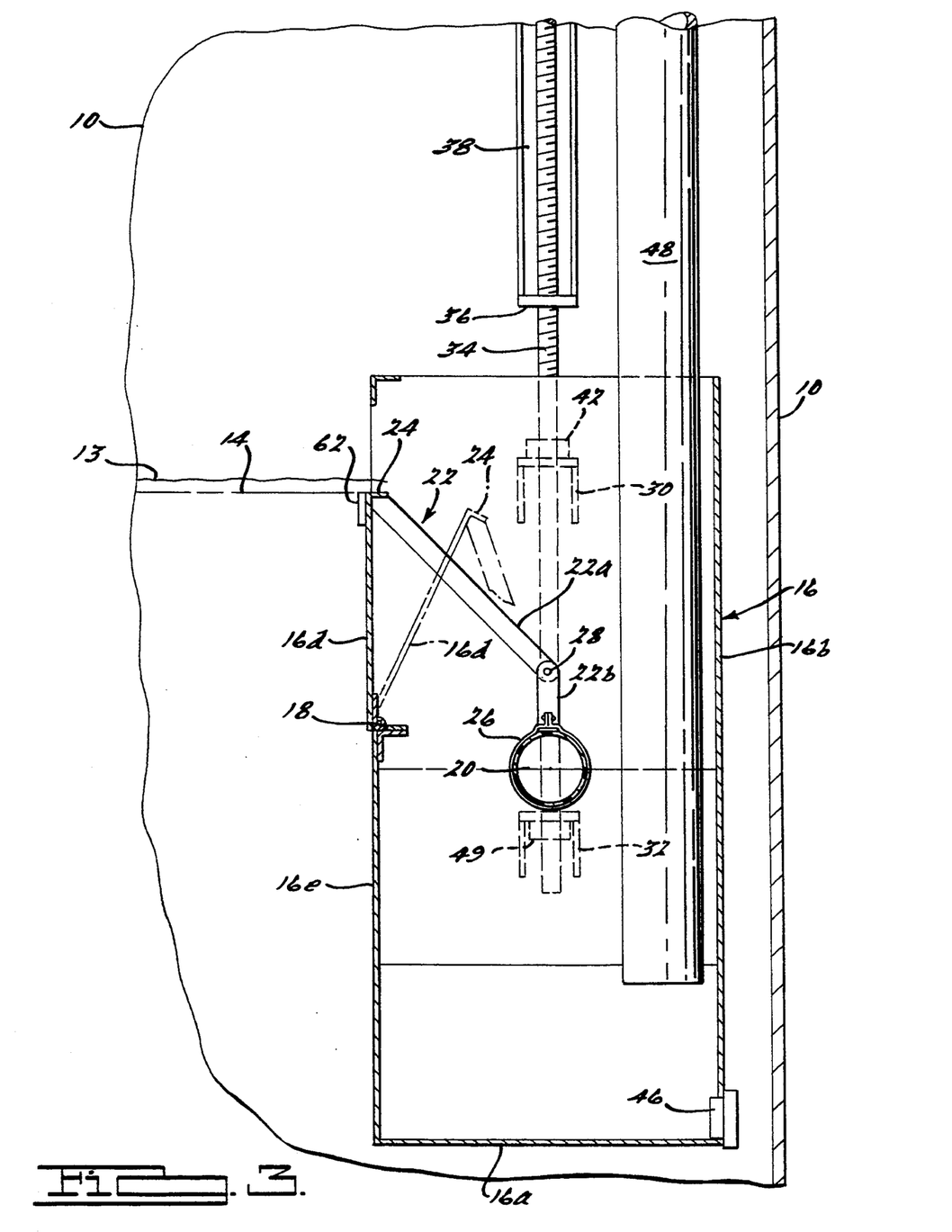
FIG. 3 is a sectional view taken in the direction of the arrows substantially along the line 3—3 of FIG. 2.

An upper portion 16d of the front wall comprises a swinging weir pivotally connected at 18 to a lower front wall portion 16e, FIG. 3. Also located within the box 16 is a cylindrical float 20 that extends transversely essentially the entire width of the box 16, FIG. 2, and may float on the sludge 29 within box 16. The float 20 is connected with the weir 36d by means of a pair of rigid transversely spaced dog-leg brackets 22, each formed by upper and lower rods 22a and 22b. The upper end of each longer rod 22a is connected to and fixed with respect to an upper flange 24 of the weir 16d. The lower end of each shorter rod 22b is connected to and fixed by means of a screw clamp 26 to the float 20. The opposite ends of each pair of rods 22a and 22b are adjusted to a predetermined angle therebetween, then tightly secured together by a bolt 28 to prevent displacement from the adjusted position until the bolt 28 is loosened.

A pair of upper and lower platform brackets 30 and 32, respectfully, are secured at fixed positions to the opposite lateral walls 16c and are adjustable vertically by screw action along a pair of lateral screwthreaded guide rods 34. Each guide rod 34 also extends slidably through a pair of vertically spaced brackets 36 secured to the adjacent side wall of the tank 10 and spaced by a stabilizing bracket 38. A collar nut 40 is adjustable screwed on the upper end of each rod 34 into position against the upper surface of the associated bracket 36 to adjustable locate the vertical position of the rod 34. Similarly, collar nuts 42 and 44 are adjustable screwed on the rod 34 against the platforms of the brackets 30 and 32, respectively, to adjustable locate the vertical position of the weir box 16 within the tank 10. A removable drain plug 46 is provided in the lower portion of the box 16 to enable periodic flushing and cleaning.

A suction pipe 48 extends centrally within a rear portion of the box 16 and has a lower opening about 4" below the average level 29 of the sludge to assure removal of paint solids that float near the surface 29. The sidewalls 16c converge at 16cc to the bottom 16a to minimize the overall volume of the box 16. The upper portion of the pipe 48 communicates with a consolidator and filter device 50, described in detail below and which may be of the general type described in the aforesaid Turnquist patents. A pump 52 associated with pipe 48 pumps or sucks the watery sludge from the box 16 into the consolidator 50 for further processing and separation of paint solids from the water. The paint solids are removed from the sludge by the improved consolidator or filter 50 described herein and the resulting clear water is discharged via gravity through conduits 56 and 12 to tank 10, FIG. 6.

A pump 58, FIG. 1, in communication with the lower portion of the tank 10, well below the floating paint solids 13, pumps clear water via conduit 60 to the paint spray booth for reuse in the waterfall. The capacity of pump 58 is adjusted to equal the volume of water required for the waterfall in the paint spray booth, which in turn equals the water entering via pipe 12. Thus the water "in" essentially equals the water "out". The pump 52 is adjusted to evacuate box 16 at the desired rate of inflow of water and paint solids over the upper surface 24 of the weir 16d.

Figure 4:
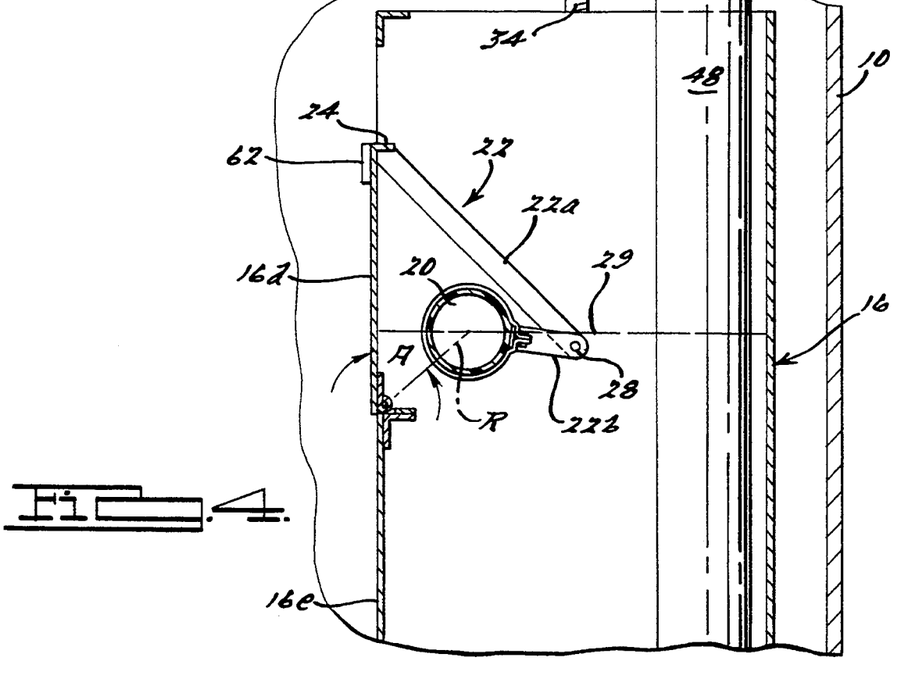
FIG. 4 is a view similar to FIG. 3, showing the dog-leg connection between the float and weir adjusted to effect a pulsating flow of water and floating solids over the weir, the parts being shown near the beginning of a pulse cycle.
Figure 5:
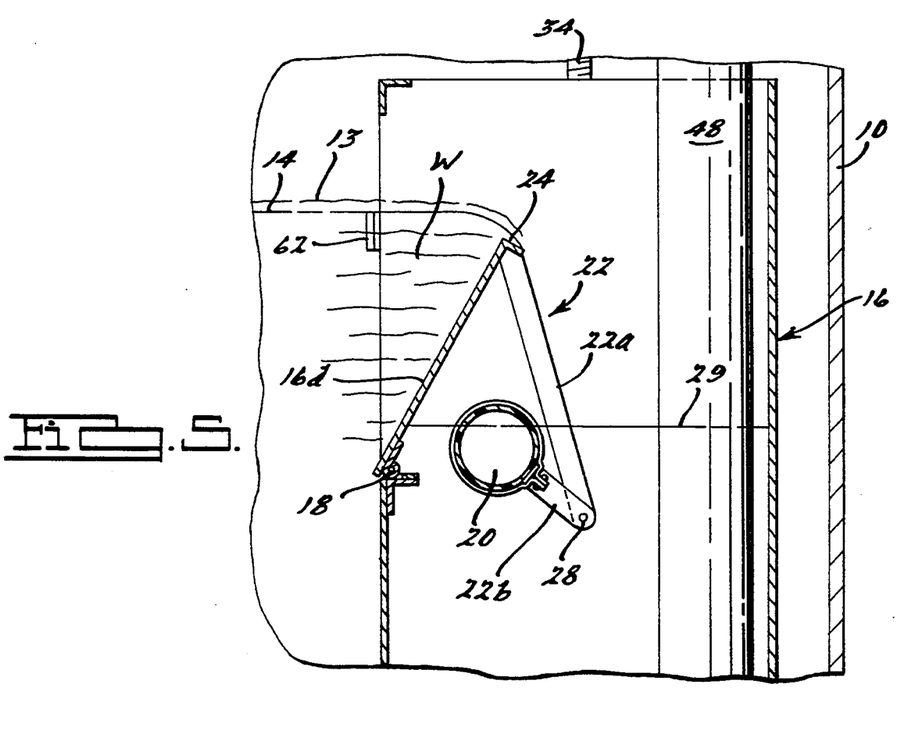
FIG. 5 is a view similar to FIG. 4, showing the float and weir at an intermediate stage of the pulse cycle.

It is apparent from the foregoing that upon lowering of the float 20 in FIGS. 4 and 5, the weir 16d will swing inwardly to lower its upper surface 24 and increase the rate of flow of the watery sludge into box 16. When the float 20 rises, it will swing the upper end 24 of the weir 16d leftward and thereby raise the surface 24 and decrease the amount of water flow into the box 16. In consequence the weir 16d will attain an equilibrium position whereat the inflow of water and paint solids into the box 16 equals the quantity of sludge removed via conduit 48.

Undesirable bypass flow between the lateral edges of the weir 16d and the sidewalls 16c may be minimized by numerous means. In the present instance, the lateral edges of the weir 16d swing in proximity to the sidewalls 16c, and outward swinging of weir 16d beyond the lateral walls 16c is prevented by stops 62 secured to the walls 16c in position to engage the outer face of weir 16d, FIG. 2 and 3, when the latter is at the outermost upright position. By loosening the bolt 28, the angle of the dog-leg between the rods 22a and 22b may be adjusted so that after tightening of the bolt 28, the angular position of the weir 16d will be preselected for any vertical position of the float 20 within the limits of its adjustability. Preferably the rods 22a are several times longer than the rods 22b to facilitate the desired adjustment.

When the box 16 is initially installed with any particular tank 10, its position within the latter may be adjusted vertically by means of the adjustable collar nuts 40, 42 and 44 screwed on rods 34. Thereafter, further adjustments of the vertical position of the box 16 with respect to the tank 10 is seldom required unless there is a change in operating conditions, such as the use of the tank 10 with a different number of paint spray booths, or possibly the use of a different spray procedure or a different type of spray paint.

Although the above noted water "in" equals the water "out" is essentially true, some water will of course be lost by evaporation and is replaced conventionally by means not shown. A stilling well 64 is conventionally supported within the tank 10 to extend above and below the desired average water level 14 and supports high water and low water sensors 66 and 68. When the water level falls to the lower extent of sensor 68, in consequence of evaporation or other reasons, make-up water will be supplied, as for example via conduit 12, until the level 14 rises to the lower extent of sensor 66.

Referring to FIGS. 4 and 5, the leverage of the float 20 resisting initial clockwise movement of the weir 16d from the vertical position is a function of the length of the radial arm R, between pivot 18 and the center of float 20, and a function of the angle A between that arm and the vertical. The effects of these functions may be preselected by loosening the bolt 28 and adjusting the dog-leg angle between the rods 22a and 22b. The greater the length R and the angle A, the greater will be the effectiveness of the float 20 in closing or counterclockwise swinging of the weir 16d. By adjusting the float 20 to the position illustrated in FIG. 4, the resistance of the float 20 to clockwise swinging of weir 16d may be reduced to the extent that when the weir 16d is at the upright closed FIG. 4 position, the effectiveness of the float 20 holding the weir 16d closed is essentially balanced by the pressure of the tank water 14 tending to open the weir 16d when the level of that water rises adjacent to the weir top 24.

If the paint overspray into the waterfall backdrop and then over the weir 16d is comparatively small, flow of water over the weir and the capacity of pump 52 will be reduced correspondingly in order to enable use of a comparatively small and economical consolidator 50. The reduced flow of water over a wide weir 16d, i.e., a weir having a long upper surface 24, could result in a water flow too shallow to carry the floating paint solids. The shallow water flow over the weir 16d would then pass under the paint solids 13, which would pile up as a cohesive mass without flowing over the weir, and then periodically break loose and flow over the weir in a large mass. Such operation is avoided in accordance with the present invention by adjusting the dog-leg connection 22 as illustrated in FIG. 4.

Assuming an initial situation wherein the weir 16d and the tank water level 14 is slightly below the top level 24 of the weir 16d, water flowing into the tank 10 from pipe 12 gradually raises the water level 14. Simultaneously the float 20 will gradually fall because the pump 52, see FIG. 3, removes sludge from the box 16 at the aforesaid reduced rate to accommodate a consolidator 50 of small size. In this regard, the lower end of pipe 48 will still be approximately 3" to 4" below the desired average level of the sludge 29 and several times that distance from the clear water adjacent to the bottom 16a.

The rising water level 14 and the falling float 20 will cause a slight clockwise opening of the weir 16d toward the FIG. 5 position, whereupon the weight W of the tank water above the inclined upper surface of the weir 16d exerts additional force urging the weir clockwise. This weir opening force increases the more the weir 16d opens in consequence of continued lowering of the float 20 by operation of pump 52. A trickle of water may flow over the weir 16d as it gradually opens, but eventually the combined forces of the tank water pressure and the weight W depresses the float 20 into the sludge 29 sufficiently to effect a momentary surge of water over the weir in sufficient depth and quantity to exceed the capacity of the pump 52 and carry the accumulated floating paint solids into the box 16.

In consequence the sludge level 29 rapidly rises in box 16, but the inertia of the weir and float system momentarily delays closing movement of the weir 16d as rapidly as the sludge level rises. In consequence, the level of the sludge 29 rises during the surge sufficiently, so that when the float 20 returns to an equilibrium position on the sludge 29, the weir 16d will be returned to its starting position, FIG. 4. Also, as the weir 16d swings counterclockwise, the weight of the tank water W on the upper inclined surface of the weir 16d decreases, thereby to facilitate the counterclockwise swinging. During the surge operation, the level of the tank water 14 is not appreciably affected.

The continued operation of the pump 52 again begins to lower the sludge level 29. Thus the cycle will be repeated to effect a pulsating discharge of water and floating solids over the weir 16d and into the box 16 several times a minute and at the average rate that pump 52 discharges sludge 29 from the box 16. By operating the weir box 16, either as described in regard to FIGS. 1 and 2, or in the pulse mode described in regard to FIG. 3 and 4, the box 16 may be used with various paint spray installations where the volume of paint overspray varies widely.

Referring to FIGS. 6–9, details of the second stage separation system are illustrated. The collection tank 10 and weir box 16 are illustrated schematically in FIG. 6 and may be essentially the same as in FIG. 1. However, the float 20 and dog-leg brackets 22 are dimensioned and arranged with respect to each other to effect an enhanced operation. Specifically, when the weir 16d is adjacent to its closed position to prevent flow of water and sludge into the box 16, the float 20 will be below the sludge level 29 and its buoyancy will remain constant.

The size of the float 20 and the fixed angle of the arms 22a and 22b are predetermined so that when the weir 16d extends angularly inwardly of the box 16 and the float 20 is located essentially directly below the upper weir edge 24, the weir 16d will be in balance at a closed position to prevent flow into the box 16, as for example at the start of a pulse cycle. The sludge level 29 behind the weir 16d aids the float 20 in holding the weir 16d at the balanced closed position. As the pump 52 pumps sludge from the box 16, the pressure of the sludge resisting opening of the weir 16d decreases, enabling a slight clockwise opening movement of the weir 16d, whereby the effectiveness of the weight of the tank water upstream of the weir 16d urging clockwise opening movement is increased and water and sludge flow momentarily into the box 16 at a rate faster than sludge is pumped from box 16.

The sludge level 29 then rises to increase its resistance to clockwise opening of the weir 16d. As the weir 16d swings clockwise in FIG. 6, the leverage of the float 20 resisting clockwise swinging increases, causing the weir 16d to swing counterclockwise toward the closed position and gradually reduce the rate of flow over the edge 24 into box 16. When that flow becomes less than the rate of sludge removal effected by pump 52, the sludge level 29 again begins to fall and initiate a gentle pulsating flow over the weir 16d.

As noted in FIG. 6, the float 20, essentially under the upper weir edge 24 in the operative pulsating positions, is spaced from the wall 16e approximately a third of the distance between the walls 16b and 16e, and the inlet for conduit 48 is adjacent to the wall 16b a few inches below the sludge level 29. In consequence of the pulsating flow over the edge 24 and into the weir box 16 adjacent to the float 20, and the latters downward and rightward pulsating movement simultaneously with the pulsating flow, the sludge circulates within box 16 toward the inlet of pipe 48, substantially as indicated by the arrows. Typically the edge 24 moves gently back and forth during the pulsating flow over the weir 16d. Depending upon the arrangement of the brackets 22 and float 20, the flow could stop momentarily between pulses, but typically the pulsating flow is continuous, each pulse being one or two seconds in duration.

Figures 5, 6A:
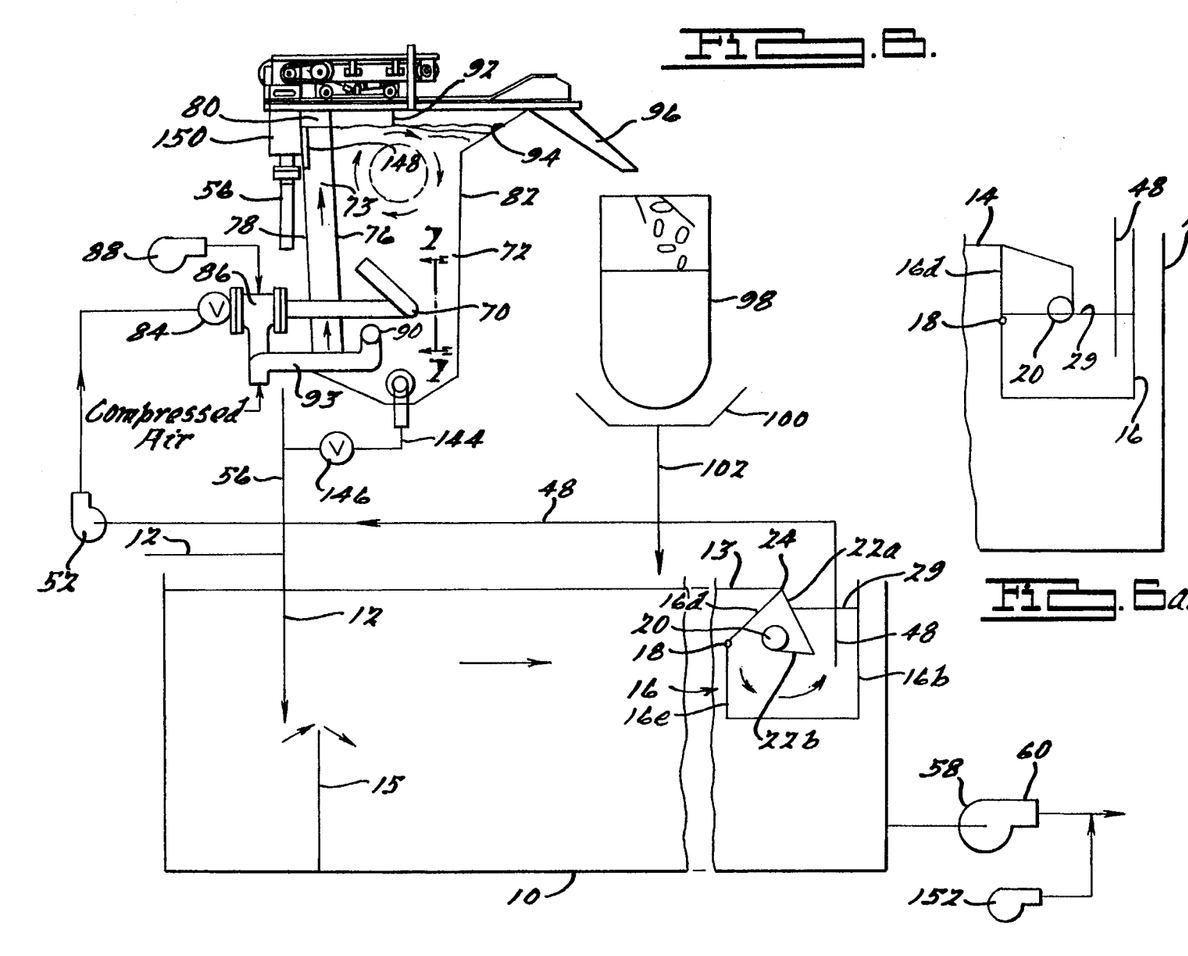
FIGS. 6a and 6b are schematic views illustrating modification of the float control for the weir.
Figure 6B:
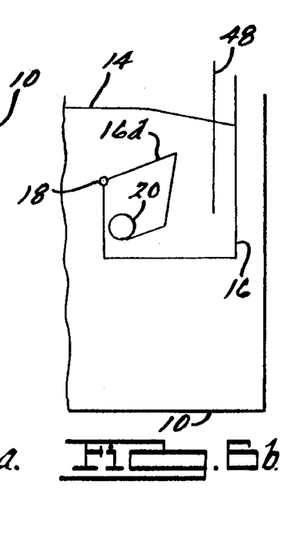

FIGS. 6a and 6b illustrate a modified flow control over the weir 16d that is especially suitable when the incoming flow of paint particulates from the paint spray booth is very slow and the average rate of flow over the weir 16d, as well as the discharge flow from box 16 via conduit 48, are also desirably slow. FIG. 6a illustrates the position of the float and weir 6d at the closed position. As explained above, when pump 52 extracts sludge from box 16 and causes the sludge level 29 to fall, the weir 16d gradually opens clockwise. In FIG. 6a, the sludge level 29 and float 20 are above the weir pivot 18. Thus the sludge within box 16 does not resist clockwise opening movement and a flood of water and sludge flows over the weir top 24 at a rate far in excess of the rate that the sludge is pumped via conduit 48 from the box 16. The float 20 will be submerged momentarily as illustrated in FIG. 6b, before it pops back to the elevated level 29 and swings weir 16d counterclockwise to the closed starting position. A comparatively vigorous repetitive pulse cycle results that carries the floating particulates over the weir in surges with a minimum average water flow over the weir 16d.

It is of course desirable to separate the floating paint particulates from the water in tank 10 while minimizing the quantity of water flowing over the weir 16d. Without recourse to the pulsating flow as described, the same average flow of water over the weir 16d in a steady stream would be too shallow to carry the floating particulates with it. In consequence, the particulates would pile up upstream of the weir 16d and essentially clear water would flow over the weir 16d and under a piled-up mass of floating particulates. Some of the piled-up mass would periodically break apart and pass over the weir 16d, but not until an excessive quantity of clear water had already passed under the floating mass.

Figure 7:
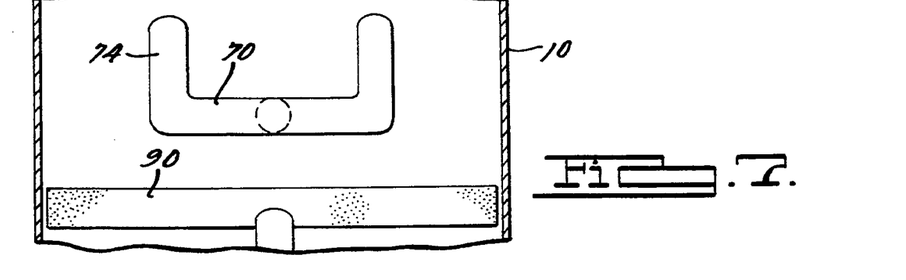
FIG. 7 is an enlarged view of the aeration diffuser and bifurcated sludge entry, taken in the direction of the arrows 7—7 of FIG. 6.

From the box 16, the sludge is pumped via conduit 48 to a bifurcated inlet 70, FIG. 7, into consolidator tank 72. The inlet 70 extends transversely within the tank 72 adjacent to its bottom and terminates at its opposite ends in upturned nozzles 74 that discharge adjacent to and angularly upwardly toward a baffle 76 closely spaced from one sidewall 78 of the tank 72, thereby to impart a clockwise spiral flow to the watery sludge, i.e. rightward in FIG. 6 adjacent to the water level 80 and toward an opposite side 82 of the tank 72. The baffle 76 also partitions a sludge containing portion at the right in tank 72 from a clear water passage 73 at the left of baffle 76.

Downstream of the pump 52, the watery sludge passes through a flow control valve 84 and a coupling 86 to the bifurcated inlet 70. In order to increase the buoyancy of the floating paint solids or sludge in tank 72, a flocculation agent or detackifier is pumped at a metered rate by pump 88 into the watery sludge at coupling 86.

To further enhance the desired flow of the floating sludge from left to right adjacent to the water surface 80 in tank 72, a unique air bubbler 90 extends transversely across the tank 72 adjacent to the baffle 76 and directly below the discharge ends of the paired inlet nozzles 74. The bubbler 90 is supplied with compressed air at about 10 psi from a source 93 supported by coupling 86, but not in communication with conduit 48 and inlet 70. The bubbler 90 comprises a transverse plastic pipe closed at it opposite ends and having foramenous sidewalls to provide a multitude of tiny air bubbles dimensioned in accordance with the average size of the floating paint particulates, thereby to carry the particulates slowly and gently upwardly toward the surface 80. Usually the air bubbles are in a size range from 50 to 100 microns.

Figure 8:
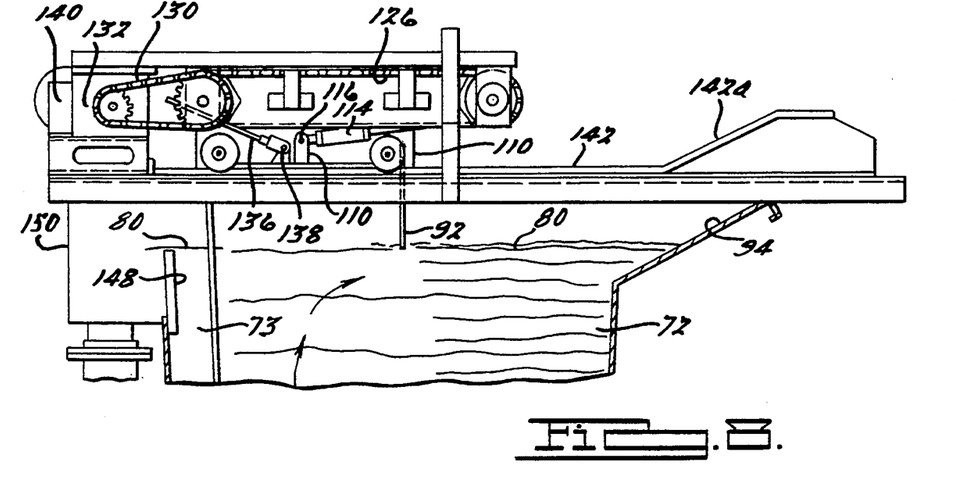
FIG. 8 is an enlarged schematic side view of the consolidator and scraper mechanism.

As the floating paint particulates flow upwardly adjacent to the baffle 76, they accumulate as a mass at the surface 80 and flow from left to right in FIGS. 6 and 8. As additional particulates reach the surface 80, they push the overlying particulates above the water surface, whereby the water in the uppermost particulates drains back into the tank 72. In consequence, the weight of the uppermost particulates decreases as they drain, enabling the latter to be pushed even higher by the underlying floating paint solids. By reason of the generally clockwise water flow adjacent to the surface 80, the mass of floating paint solids becomes most dense near the upper right half of tank 72.

In the above regard, it is important that the air bubbles are sufficiently small that they do not churn the floating solids at the surface 80 nor entrain water upwardly into the draining paint solids. The bubbles must merely seep through the floating solids to the atmosphere.

After a time period of approximately 20 to 30 minutes, the floating mass builds up to an optimum extent whereat the underlying solids can not effectively support any additional build up. By that time the uppermost solids have drained sufficiently that their dry weight amounts to about 10–15% of the sludge mass. A scraper 92 is then activated to scrape the top most and driest layer of the particulates from left to right across the tank 72, up a ramp 94, into a discharge chute 96, and then into a final filter or dewatering bag 98. Some of the water unavoidably carried up the ramp with the paint solids tends to drain down the ramp 94 and back into the tank 72. The resulting sludge discharged into the bag 98 resembles cottage cheese in texture but contains about 50% to 70% less water than the sludge extracted from conventional consolidators heretofore. In consequence, use of a shorter ramp 94 with less incline is feasible because less time on the ramp is required for drainage back into the consolidator tank 72. As a further consequence, less paint particles adhere to the ramp, its periodic cleaning is simplified, and objectional odors resulting from bacterial contamination of paint solids on the ramp are reduced. Furthermore the dryer paint particles discharged into the bag 98 are both lighter and more compact than sludge discharged from conventional consolidators. Thus the porous filter material that forms the bag 98 is subjected to less strain, less frequent emptying and replacement of the bag is required, and the time required to filter water from the dryer paint solids is reduced, as compared to the filtering of wetter paint solids heretofore.

The bag 98 is a final filter of porous material which allows passage of water into a drip pan 100 and retains the paint solids. From the pan 100, the water is returned by conduit 102 to the collecting tank 10. The bag 98 is replaced periodically with an empty bag and the paint solids removed from the full bag 98 find various uses as fillers or for fuel.

After the first scraping traverse of the scraper 92 and the removal of the top layer of solids, the resulting reduced mass of solids above the water level 80 enables the floating solids below the surface 80 to raise the top of the floating mass again into the path of the scraper for a repeat of the scraping action. After about 4 to 6 traverses of the scraper in about a 5 minute period, the newly pushed-up mass of paint solids are too wet for removal. The scraper 92 is then deactivated to allow drainage of the uppermost solids into the tank 72 before the start of the next scraping cycle. The scraping action starts at about the mid-region of the tank 72. The carriage 110 moves slowly along the tracks 142 toward and finally up the incline 142a above the ramp 74 at a speed approximating three to five feet per minute. At higher speeds, too much water or improperly drained sludge will be carried along ahead of the scraper 92.

Figure 9:
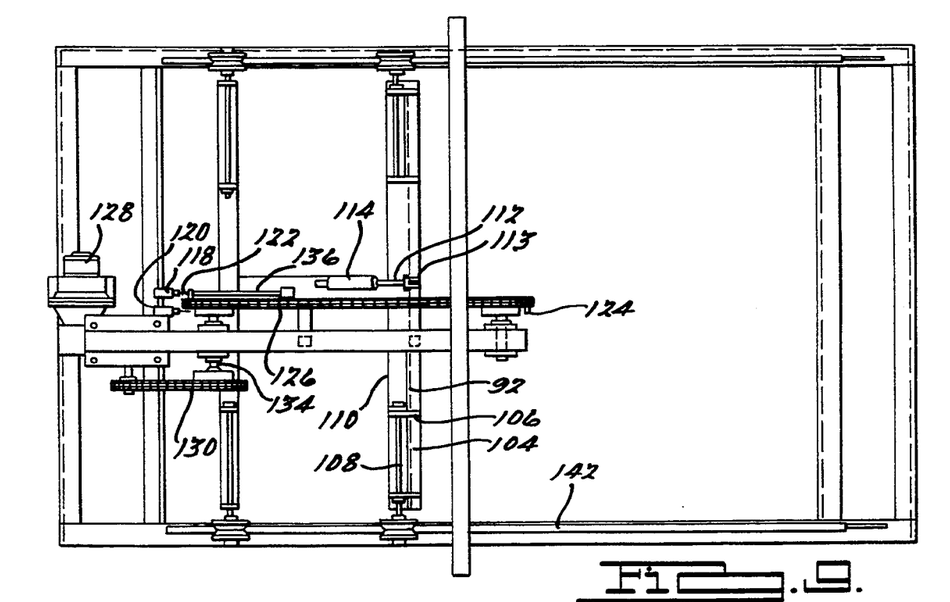
FIG. 9 is a schematic plan view of FIG. 8.

Referring to FIGS. 8 and 9, the scraper 92 is a blade that extends across the width of the tank 72 and downwardly approximately an inch into the drained paint solids at the beginning of the scraping cycle. The upper edge of the scraper 92 is supported by an upper horizontal transverse bracket 104 that in turn is supported by four brackets 106 pivotally connected at 108 to a frame portion of a wheeled carriage 110 for swinging about a transverse horizontal axis. Above the axis of pivot 108, the upper edge of the bracket 104 is pivotally connected at 113 to the outer end of a pneumatically actuated piston rod 112 associated with a cylinder 114. The piston-cylinder assembly 112, 114 comprises part of an operative pneumatic circuit. The cylinder 114 is pivotally connected at 116 to another frame part of carriage 110. The pneumatic circuit also comprises a pair of limit switches 118, 120 associated with actuators 122, 124 respectively carried by a sprocket chain 126.

A pneumatic motor 128 is operatively connected by a speed reducing mechanism 132 with a drive chain 130, which is operatively connected by a drive mechanism 134 with chain 126 to drive the latter. Limit switch operator 122 is connected to one end of a drive rod 136 having its opposite end pivotally connected at 138 to another part of the carriage 110. Operation of motor 128 is controlled by a manually adjustable automatic timing devise 140 which also controls operation of the carriage 110 and scraper 92.

FIG. 8 illustrates the position of carriage 110 at the beginning or "end" of a cycle whereat actuator 122 has just engaged limit switch 118 to start the timing cycle controlled by timer 140. After a preselected time interval sufficient to allow a build up and drainage of paint solids as described above, say one half hour to an hour, the timer 140 actuates motor 128 to drive sprocket chain 130, which in turn drives sprocket chain 126 and moves actuator 122 thereon downwardly from its FIG. 8 position and rightward, thus driving rod 136 and connection 138 to move carriage 110 and scraper blade 92 rightward and scrape a top layer of drained paint solids up the ramp 94.

As the carriage 110 moves rightward along its tracks 142, it rides along the inclined track portion 142a substantially in parallelism with ramp 94, pushing a top layer of paint sludge ahead of the scraper 92 and over the ramp 94 and into chute 96. When the forward end of carriage 110 reaches the forward end of track 142a, actuator 124 on chain 126 engages limit switch 120, which causes actuation of the piston-cylinder assembly 112, 114 to contract piston rod 112 and swing the lower end of scraper 92 counterclockwise about the axis of pivot 108 to a position above the floating paint solids. Essentially simultaneously, the limit switch 120 causes motor 128 to reverse and move carriage 110 rearwardly or leftward to the starting position, whereat actuator 122 engages limit switch 118 to actuate cylinder 114 and extend rod 112. Scraper blade 92 is thus returned to its FIG. 8 scraping position. The timer 140 continues its operation to repeat the scraping cycle several times during approximately a five minute period. Upon the completion of each scraping operation, the removed paint solids are replaced by the immediately underlying paint solids until the newly uplifted paint solids contain so much water that their removal is no longer desired. The timer then deactivates the motor 128 throughout another drainage cycle.

Referring again to FIG. 6, the clear water at the bottom of tank 72 is removed in part through conduit 144, metering valve 146, and conduits 56, 12 to tank 70. Additionally, clear water is conducted upwardly between baffle 76 and sidewall 78 to overflow a vertically adjustable control weir 148 into a header 150 and then via discharge conduit 56 to tank 10. Control weir 148 is manually adjustable to perform the important function of controlling the water level 80 so as to obtain optimum performance from the scraper 92.

Usually the discharge from conduits 144 and 56 is controlled to be substantially equal. When it is desired to measure the rate of flow of sludge over weir 16d, valve 146 is closed. By knowing the transverse dimension of the weir 148 and by measuring the depth of the gravity flow over weir 148, the quantity of water, flowing over the weir 148 can readily be ascertained from standard hydraulic tables. Also by analyzing the water from header 150, the effectiveness of the separation system can be determined.

Much of the flocculation chemicals supplied by pump 88 are carried away with the paint solids discharged into bag 98. A second pump 152 is preferably provided to pump a flocculation polymer into the return line 60 from tank 10 to the paint spray booth. The water from the return line 60 is reused to collect paint overspray and is then returned to tank 10 via conduit 12.

Although the level control mechanism 64, 66, 68 attempts to maintain a constant water level 14 in tank 10, loss of water by evaporation, and with the comparatively dry paint solids discharged into bag 98, renders maintenance of a constant water level 14 impractical, such that the actual water level 14 may vary several inches between a high and low level. The weir 16d compensates for such changes in water level and enables an efficient operation of the two phases paint-water separator system that has not been possible heretofore.

I claim:

1. An apparatus for skimming floating paint particulates from water having said particulates entrained therein and for providing a condensed sludge of said particulates to facilitate their additional consolidation, said apparatus comprising the combination of
   A) a collection tank for receiving said water and entrained particulates, said tank including first and second opposed end walls and a closed bottom wall,
   B) means comprising a conduit for discharging said water and entrained particulates into said tank at a first location adjacent to said first end wall,
   C) means for extracting water from said tank at a second location adjacent to said second end wall and closed bottom wall for effecting a flow in said tank from said first location to said second location and enabling said particulates to float to the surface of said water as they flow toward said second location,
   D) a weir box positioned within said tank adjacent to said second end wall, means for adjusting the vertical position of said weir box relative to said closed bottom wall, said weir box including an adjustable weir means having an upper edge over which surface portions of said water and particulates floating thereon flow into said box,
   E) means for controlling the flow over said edge at essentially a minimum rate required to carry the floating particulates over said edge and for providing said condensed sludge in said box, said means for controlling comprising
      a) float means buoyed by said condensed sludge in said box,
      b) means for connecting said float means with said weir means for raising or lowering said edge upon rising or falling of said float means, and
      c) a sludge pump for pumping the condensed sludge from said box at essentially said minimum rate, said sludge pump having an inlet in communication with said box for receiving said condensed sludge, and having an outlet for discharging said condensed sludge for said additional consolidation.

2. An apparatus according to claim 1, said adjustable weir means includes a lower end facing said closed bottom, means for pivotally mounting the lower end of said weir means to said weir box, wherein said weir means is adjustable about a horizontal pivot axis at its lower end.

3. An apparatus according to claim 2, said upper edge of said weir means being located between said second location and said first location.

4. An apparatus according to claim 2, said weir means being pivotable about said pivot axis for swinging said upper edge upwardly in a closing direction and downwardly in an opening direction.

5. An apparatus according to claim 4, said float means and means connecting being configured and arranged to hold said weir means at a balanced position when said upper edge is at a level of the water in said tank and above a level of the sludge in said box to effect a gentle pulsating opening and closing of said weir means when said float means and means connecting cooperate to progressively increase the leverage of said float means urging closing of said weir means upon progressive opening thereof.

6. An apparatus according to claim 5, said float means being configured and arranged to be submerged in said sludge when said weir is at said balanced position.

7. An apparatus according to claim 1 and also comprising a consolidator, said consolidator comprising a consolidator tank including an open top and having sludge inlet means adjacent to and spaced from a closed bottom of said tank for receiving the condensed sludge pumped from said outlet of said sludge pump, whereby as said consolidator tank fills, said particulates gradually separate from the water in said sludge and flow to an upper surface thereof to form a floating mass of said particulates at said upper surface, and whereby water remaining in said mass drains back to the underlying sludge, means for gently enhancing the floating of said particulates to said upper surface without churning said mass comprising an air diffuser in said consolidator tank positioned between said sludge inlet means and said closed bottom, said diffuser comprising a container for compressed air having a multitude of tiny orifices for discharging said air in streams of tiny bubbles between approximately 50 and 100 microns in size, and a scraper operative to pass across a top of said mass of floating particulates in a scraping action to scrape a top layer of said particulates from said mass.

8. An apparatus according to claim 7, timing means for controlling the operation of said scraper and effective to actuate said scraper periodically to repeat said scraping action at time intervals predetermined to enable replacement of the scraped away particulates by upward floating of said mass as particulates entering at said sludge inlet means and carried upwardly by said bubbles underlie said mass.

9. An apparatus according to claim 7, said consolidator tank having a baffle spaced between front and rear walls of said consolidator tank to provide a sludge containing portion of said consolidator tank between said front wall and said baffle, said sludge inlet means including means for directing said particulates, entering via said sludge inlet means, upwardly toward said open top and rearwardly toward said baffle and cooperating with said air bubbles for enhancing a flow of said entering particulates upwardly and rearwardly toward said baffle and then toward said front wall of said consolidator tank as said particulates approach said upper surface, where said sludge inlet means is arranged to discharge said sludge angularly upward toward said baffle.

10. An apparatus according to claim 9, said diffuser extending essentially horizontally across said consolidator tank in parallelism with said baffle.

11. An apparatus according to claim 9, and means for withdrawing clarified water from said consolidator tank at a location upstream of the flow of said particulates to said upper surface from said sludge inlet.

12. An apparatus according to claim 9, said baffle partitioning said consolidator tank to provide a forward sludge containing portion forward of said baffle and a rearward clarified water containing portion rearward of said baffle, passage means providing communication between said forward and rearward portions, said passage means opening into said forward portion near the bottom of said consolidator tank, said means for directing the particulates entering via said sludge inlet means comprising a conduit having an outlet end within said sludge containing portion at a location above the opening of said passage means into said forward portion, said outlet end being directed at an angle upwardly and rearwardly toward said baffle, said rearward clarified water containing portion having an upper wall portion defined by a weir arranged for flow of clarified water thereover from said clarified water containing portion, the last named weir being adjustable to predetermine the water level in said rearward and forward portions of said consolidator tank, a weir box arranged to receive the clarified water flowing from said rearward portion over said last named weir, and means for extracting clarified water from the last named weir box.

* * * * *